(12) United States Patent
Riley

(10) Patent No.: US 7,340,545 B2
(45) Date of Patent: Mar. 4, 2008

(54) DISTRIBUTED PEER-TO-PEER COMMUNICATION FOR INTERCONNECT BUSSES OF A COMPUTER SYSTEM

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/203,733

(22) Filed: Aug. 15, 2005

(65) Prior Publication Data

US 2006/0015671 A1 Jan. 19, 2006

Related U.S. Application Data

(63) Continuation of application No. 09/967,607, filed on Sep. 29, 2001, now Pat. No. 7,028,132.

(51) Int. Cl.
*G06F 13/362* (2006.01)

(52) U.S. Cl. .................. 710/117; 710/45; 340/3.21; 370/458

(58) Field of Classification Search ............. 710/107, 710/113, 117, 45; 340/3.21; 370/458, 461
See application file for complete search history.

(56) References Cited

U.S. PATENT DOCUMENTS

| | | | |
|---|---|---|---|
| 5,507,002 A * | 4/1996 | Heil ............................ 710/8 |
| 5,544,324 A | 8/1996 | Edem et al. |
| 5,778,218 A | 7/1998 | Gulick |
| 5,826,034 A | 10/1998 | Albal |
| 5,857,086 A | 1/1999 | Horan et al. |
| 5,987,555 A | 11/1999 | Alzien et al. |
| 5,991,520 A | 11/1999 | Smyers et al. |
| 6,175,889 B1 * | 1/2001 | Olarig ........................ 710/309 |
| 6,201,789 B1 | 3/2001 | Witkowski et al. |
| 6,205,500 B1 | 3/2001 | Sabotta et al. |
| 6,252,886 B1 * | 6/2001 | Schwager et al. ........... 370/443 |
| 6,415,367 B1 * | 7/2002 | Baxter et al. ................ 711/158 |
| 6,539,081 B2 | 3/2003 | Zakrzewski et al. |
| 6,539,450 B1 | 3/2003 | James et al. |
| 6,557,068 B2 | 4/2003 | Riley et al. |
| 6,559,675 B2 | 5/2003 | Koo |
| 6,631,415 B1 | 10/2003 | James et al. |
| 6,651,122 B2 | 11/2003 | Porterfield |
| 6,669,633 B2 | 12/2003 | Brodsky et al. |
| 6,728,821 B1 | 4/2004 | James et al. |
| 6,993,611 B2 * | 1/2006 | Ajanovic et al. ............ 710/107 |
| 2002/0018477 A1 | 2/2002 | Katz |
| 2002/0083245 A1 | 6/2002 | Meulenhof et al. |
| 2003/0009432 A1 | 1/2003 | Sugahara et al. |
| 2003/0202539 A1 | 10/2003 | Fukunaga et al. |
| 2004/0044820 A1 * | 3/2004 | Ajanovic et al. ............ 710/305 |

OTHER PUBLICATIONS

Hoch GB, Lee T, McCrary R, Parker E, "Hardware Control of Isochronous Data Transfer Between P1394 and PCI Busses", IBM Technical Disclosure Bulletin 38:5, May 1995, pp. 83-88.*
PCI-X Addendum to the PCI Local Bus Specification. Revision 1.0 Sep. 22, 1999 pp. 1-2, 13-14, and 199.
Universal Serial Bus Specification Revision 1.0, Compaq, Digital Equipment Corporation, IBM PC Company, Intel, Microsoft, NEC, Northern Telecom, cover page and pp. 2, 54-56 and 67-83 (Jan. 15, 1996).

* cited by examiner

*Primary Examiner*—Clifford Knoll

(57) ABSTRACT

There is provided a distributed peer-to-peer communication system for interconnect busses of a computer system. More specifically, there is provided a method comprising transmitting a request to establish an isochronous channel between a first device and a second device, establishing the isochronous channel between the first device and the second device, and generating an isochronous transaction across the isochronous channel between the first device and the second device, wherein the isochronous transaction is a message type transaction.

24 Claims, 15 Drawing Sheets

FIG. 6A (Prior Art)

C/BE[3-0]#: Upper Byte Count (35–32)

AD[31:0]:
- 31: R
- 30: NS
- 29: RO
- 28–24: Tag
- 23–16: Requester Bus Number
- 15–11: Requester Device Number
- 10–08: Requester Function Number
- 07–00: Lower Byte Count

FIG. 6B (Prior Art)

C/BE[3-0]#: Byte Enables (35–32)

AD[31:0]:
- 31: R
- 30: NS
- 29: RO
- 28–24: Tag
- 23–16: Requester Bus Number
- 15–11: Requester Device Number
- 10–08: Requester Function Number
- 07–00: Reserved

DISTRIBUTED PEER-TO-PEER COMMUNICATION FOR INTERCONNECT BUSSES OF A COMPUTER SYSTEM

PRIORITY

This continuation application claims priority to U.S. patent application Ser. No. 09/967,607, entitled "DISTRIBUTED PEER-TO-PEER COMMUNICATION FOR INTERCONNECT BUSSES OF A COMPUTER SYSTEM," by Dwight Riley, filed Sep. 29, 2001 now U.S. Pat. No. 7,028,132. Sections of U.S. Pat. No. 6,871,248, which was incorporated by reference into U.S. patent application Ser. No. 09/967,607, have been recited in their entirety within this continuation application. Specifically, FIGS. 10-17 and the related discussion within this continuation application are derived from FIGS. 1-8 of U.S. Pat. No. 6,871,248.

CROSS-REFERENCE TO RELATED APPLICATIONS

This application is related to the following commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey; and U.S. Pat. No. 6,871,248, entitled "Isochronous Transactions for Interconnect Busses of a Computer System," by Dwight D. Riley.

BACKGROUND OF THE INVENTION

1. Field of the Invention

The present invention is related to interconnect busses of computer systems and in particular to distributed peer-to-peer communications across such interconnect busses.

2. Description of the Related Art

Many computer systems use interconnect busses for multiple types of traffic. In addition, other embedded digital systems use interconnect busses for connecting devices in the embedded digital system. One type of interconnect traffic that would be useful is distributed peer-to-peer transactions. Although existing interconnect protocols such as PCI-X can be used for peer-to-peer traffic, interconnect transactions today are typically processor to peripheral device transactions, for security and other reasons. Existing operating systems typically do not enable devices to communicate with each other directly across interconnect busses.

Further, multiple devices and types of devices can connect to an interconnect bus. However, each device and type of device typically uses a device-specific or type-of-device-specific data format, which may be different between the devices wishing to communicate. The conventional solution again uses processor-to-device transactions, with data moving from one device to the processor. The processor then moves the data from one buffer to another, converting the data as necessary based upon pre-existing knowledge of the data formats of each device. Such a technique increases processor overhead and increases memory usage requirements.

In addition, moving data through the processor adds processor latency to the interconnect bus latency, increasing the time needed to send data from one device to another. Thus, performance overhead is increased without peer-to-peer transactions. Also, creation of new devices or data formats has typically required operating system modifications, which can significantly delay the ability to use a new device, and increases the complexity and length of time to develop device drivers.

BRIEF SUMMARY OF THE INVENTION

A disclosed technique provides for distributed peer-to-peer transactions between a requester device and a completer device over an interconnect bus of a computer system operating according to an interconnect protocol. Completer device address data is inserted into the distributed peer-to-peer transaction. A self-defining payload data is inserted into a data phase of the distributed peer-to-peer transaction. The distributed peer-to-peer transaction is then sent across the interconnect bus from the requester device to the completer device, according to an interconnect protocol.

In one embodiment, a peer-to-peer command is inserted into a command phase of the distributed peer-to-peer transaction. In another embodiment, an attribute is set in an attribute phase of the distributed peer-to-peer transaction, indicating the transaction is a distributed peer-to-peer transaction.

In another embodiment, the completer device address data includes a bus identifier and a device identifier associated with the completer device. In a further embodiment, the completer device address data includes a function identifier associated with the completer device.

In one embodiment, the interconnect protocol is the PCI-X protocol.

In one embodiment, the distributed peer-to-peer transaction is routed across a hierarchy of interconnect bus segments using the completer device address data inserted into the distributed peer-to-peer transaction.

In another embodiment, an operating system of the computer system provides a handle to indicate permission by the operating system for peer-to-peer transactions between the requester device and the completer device, inserting the handle into the data phase of the distributed peer-to-peer transaction. In a further embodiment, the requester device requests the handle from the operating system prior to sending the distributed peer-to-peer transaction. In another further embodiment, the completer device requests the handle upon receiving a distributed peer-to-peer transaction from the requester device.

In a disclosed embodiment, the self-defining payload data includes an information field and a definition field, the definition field providing structure and content definition data for the information field. The self-defining payload data can be converted by the completer device from a distributed peer-to-peer transaction format and structure into a completer device format and structure. In one embodiment, the presence of the self-defining payload data is indicated in the attribute phase of the transaction.

Another embodiment inserts an address in a completer device address space into the data phase of a distributed peer-to-peer transaction.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIGS. 6A-6B are block diagrams of conventional PCI-X requester attribute data;

DETAILED DESCRIPTION OF THE INVENTION

The present invention provides a technique for enhancing the operation of computer system busses that use the extensions to the peripheral component interconnect specification (hereinafter PCI-X busses), as well as logic circuits and signal protocols thereof. For illustrative purposes, embodiments are described herein for computer systems using Intel Corporation microprocessor architectures, and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X busses, other bus architectures and protocols, such as the 3G10 bus architecture and protocol being promoted by Intel Corporation, Compaq Computer Corporation, Microsoft Corporation, IBM Corporation, and Dell Computer Corporation, could also be used.

Figure 1:
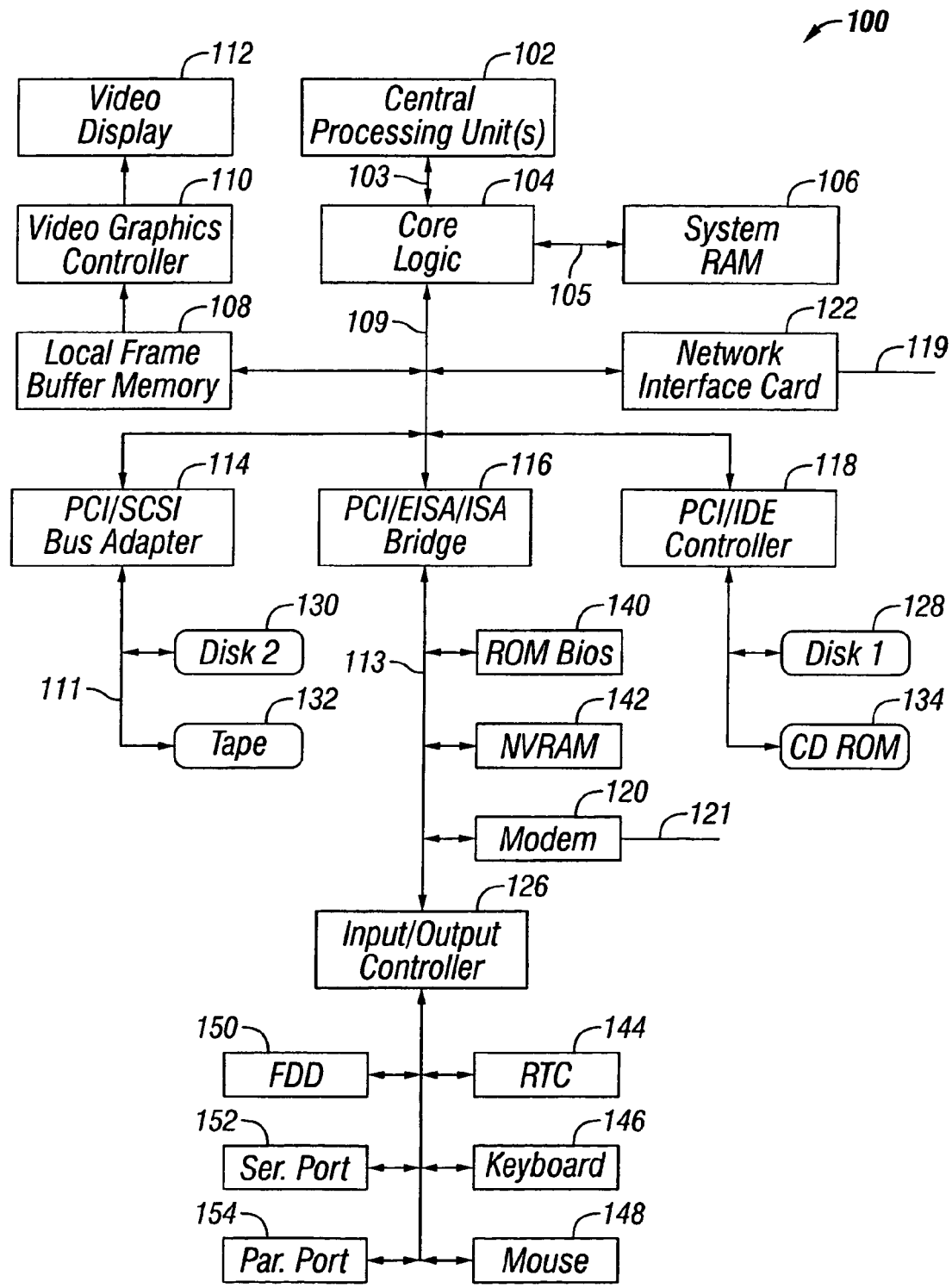
FIG. 1 is a schematic block diagram of a computer system in accordance with an embodiment of the invention.

Referring to FIG. 1, an exemplary schematic block diagram illustrates a computer system according to a disclosed embodiment. The computer system is generally indicated by the numeral 100 and comprises central processing unit(s) (CPU) 102, core logic 104, system random access memory (RAM) 106, a video graphics controller 110, a local frame buffer 108, a video display 112, a PCI/SCSI bus adapter 114, a PCI/EISA/ISA bridge 116, a PCI/IDE controller 118, and, optionally a network interface card (NW) 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus-105 and a PCI-X bus 109. More than one PCI-X bus is contemplated herein as well as PCI-X-to-PCI-X bridges (not illustrated), and is within the scope and intent of the present invention. The local frame buffer 108 is connected between the video graphics controller 110 and the PCI-X bus 109. The PCI/SCSI bus adapter 114, PCI/EISA/ISA bridge 116, PCI/IDE controller 118 and the NIC 122 are connected to the PCI-X bus 109. Some of the PCI-X devices such as the video controller 110 and NIC 122 may plug into PCI connectors on the computer system 100 motherboard (FIG. 2).

Hard disk 130 and tape drive 132 are connected to the PCI-X/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI-X bus 109 with lower interface costs.

When the computer system 100 is first turned on, start-up information stored in the ROM BIOS 140 is used to begin operation thereof. Basic setup (BIOS) instructions are stored in the RUM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI-X bus 109 and transfer information from the disk 130 to the CPU 102 via busses 109 and 103. The PCI/SCSI bus adapter 114 is a PCI-X device and remains platform independent. Therefore, separate hardware independent commands are used to setup and control any PCI-X device in the computer system 100. These hardware independent commands, however, are located in PCIX BIOS contained in the computer system ROM BIOS 140. The PCI-X BIOS is firmware that is hardware specific but meets the general *PCI Local Bus Specification, Revision* 2.2 (the PCI specification) together with the general *PCI-X Addendum to the PCI Local Bus Specification* 1.0 (the PCI-X specification), both of which are incorporated by reference herein in their entirety. Plug and play and PCI devices (both PCI and PCI-X) in the computer system are detected and configured when a system configuration program is executed. The results of the plug and play and PCI-X device configurations are stored in the NVRAM 142 for later use by the startup programs in the ROM BIOS 140 and the PCI-X BIOS that configure the necessary computer system 100 devices during startup. Also during startup a "built-in-self-test" (BIST) may do diagnostic testing of components, such as PCI-X devices, in the computer system.

Figure 2:
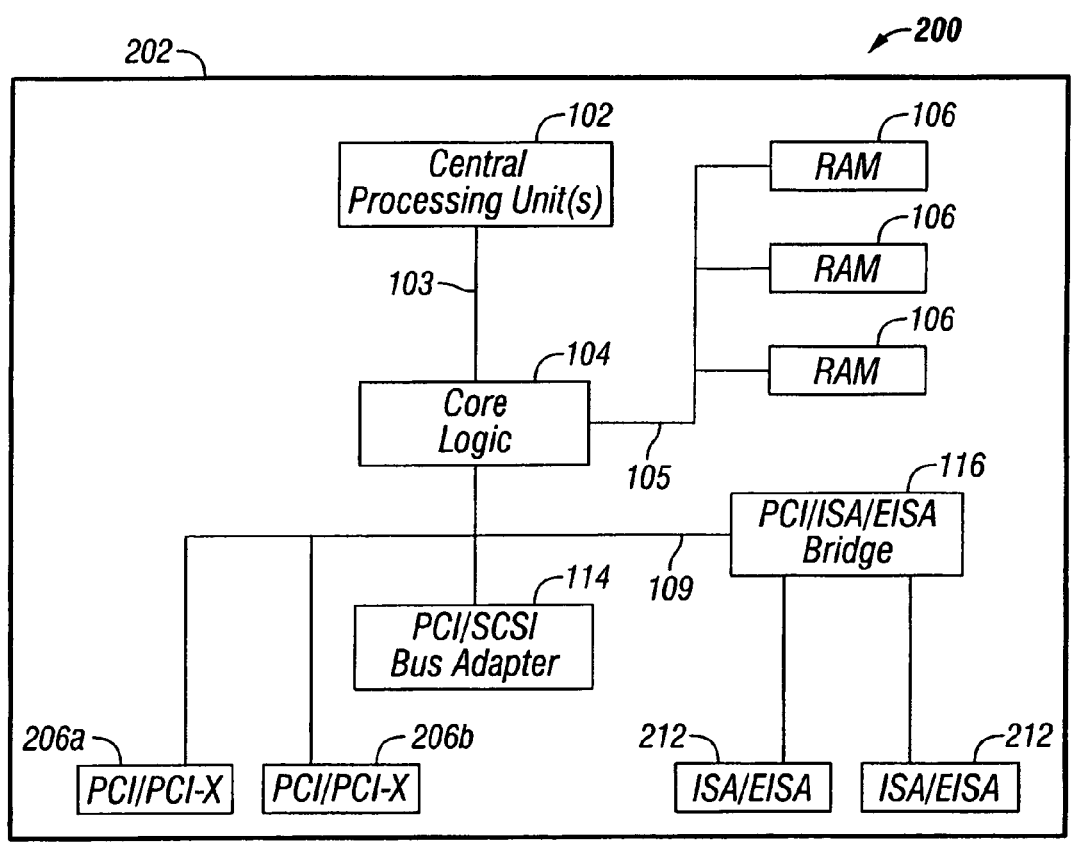
FIG. 2 is a schematic diagram of a printed circuit motherboard of the computer system of FIG. 1.

Referring to FIG. 2, a schematic diagram of an exemplary computer system motherboard according to FIG. 1 is illustrated. The computer system motherboard 200 comprises printed circuit board 202, on which components and connectors are mounted thereto. The printed circuit board 202 comprises conductive printed wiring used to interconnect the components and connectors thereon. The conductive printed wiring (illustrated as busses 103, 105 and 109) may be arranged into signal busses having controlled impedance characteristics. Illustrated on the printed circuit board are the core logic 104, CPU(s) 102, RAM 106, embedded PCI/ISA/EISA bridge 116, ISA/EISA connectors 212, embedded PCI/SCSI bus adapter 114, and PCI/PCI-X connectors 206a, 206b (connectors are the same for PCI and PCI-X). The motherboard 200 may be assembled into a case with a power supply, disk drives, etc. (not illustrated), which comprise the computer system 100 of FIG. 1.

Figure 3:
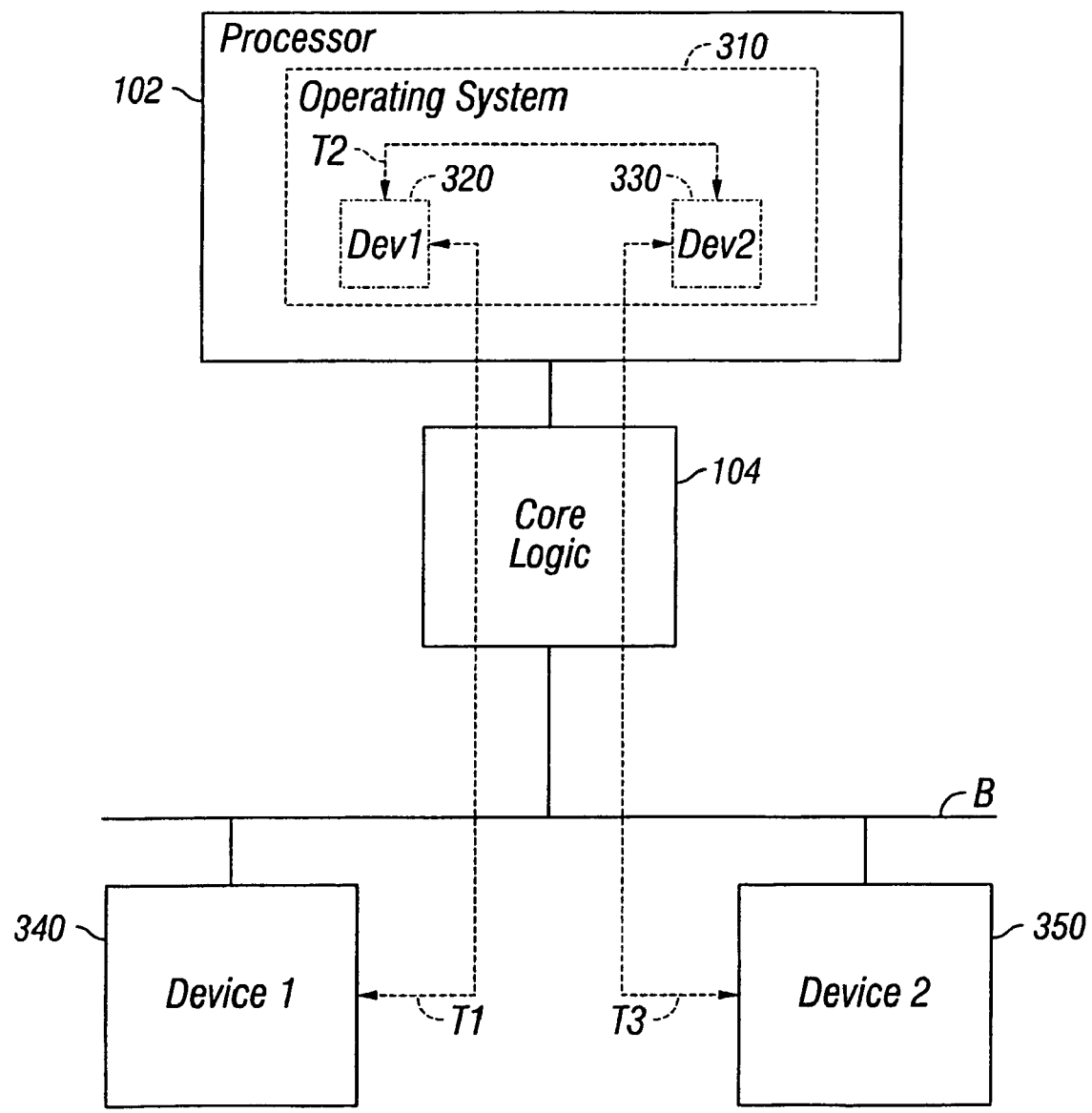
FIG. 3 is a block diagram illustrating data flow in a conventional processor-to-peripheral transaction.

As described above, conventional interconnect busses do not typically use peer-to-peer transactions. FIG. 3 is a block diagram illustrating the conventional technique for moving data from one device to another. A first device 340 communicates with a second device 350 by using the processor 102 as an intermediary. Device 340 and the processor 102 will send transactions across the interconnect bus B through the core logic 104, using a device driver 320 of the operating system 310, as indicated by arrow T1. Then the processor 102 will copy the data from a buffer associated with device driver 320 to a buffer associated with device driver 330, as shown by arrow T2. Finally, the processor 102 and the device 350 will communicate over the interconnect bus through the core logic 104, as shown by arrow T3.

Figure 4:
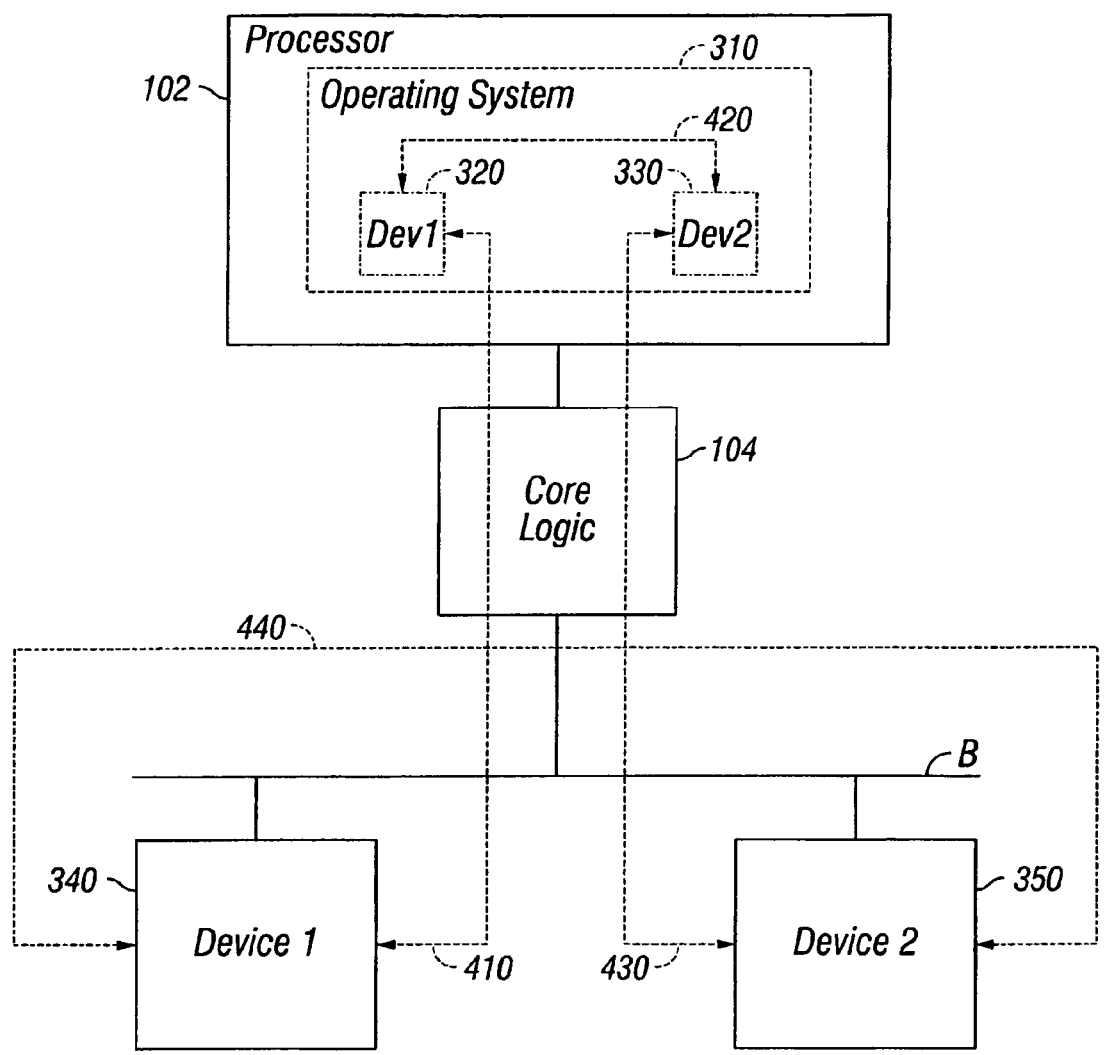
FIG. 4 is a block diagram illustrating data flow in a peer-to-peer transaction according to a disclosed embodiment.

In contrast, FIG. 4 is a block diagram illustrating a disclosed embodiment using peer-to-peer transactions. In this embodiment, device 340 issues a transaction to the processor 102 across the interconnect bus B via the core logic 104. A device driver 320 then obtains a handle in transaction 410, indicating the operating system 310 has given permission for peer-to-peer transactions between device 340 and device 350. The operating system 310 may inform device driver 330 of the request for a handle in transaction 420, allowing the device driver 330 to inform the device 350 in transaction 430 of the forthcoming peer-to-peer transactions, including sending the handle to the device 350. The device 340 then initiates a peer-to-peer transaction 440 across the interconnect bus B directly with the device 350. Although not shown in this FIG. 4, the peer-to-peer transaction 440 may cross between bridged bus segments of an interconnect bus hierarchy, if the device 340 and the device 350 are on different bus segments. In a disclosed embodiment, the handle is inserted into an attribute phase of the peer-to-peer transaction. In another embodiment, the handle is inserted into the data phase of the peer-to-peer transaction.

In another embodiment, transactions 420 and 430 are initiated at the request of the device 350 upon receipt of the peer-to-peer transaction 440 from device 340.

Figure 5:
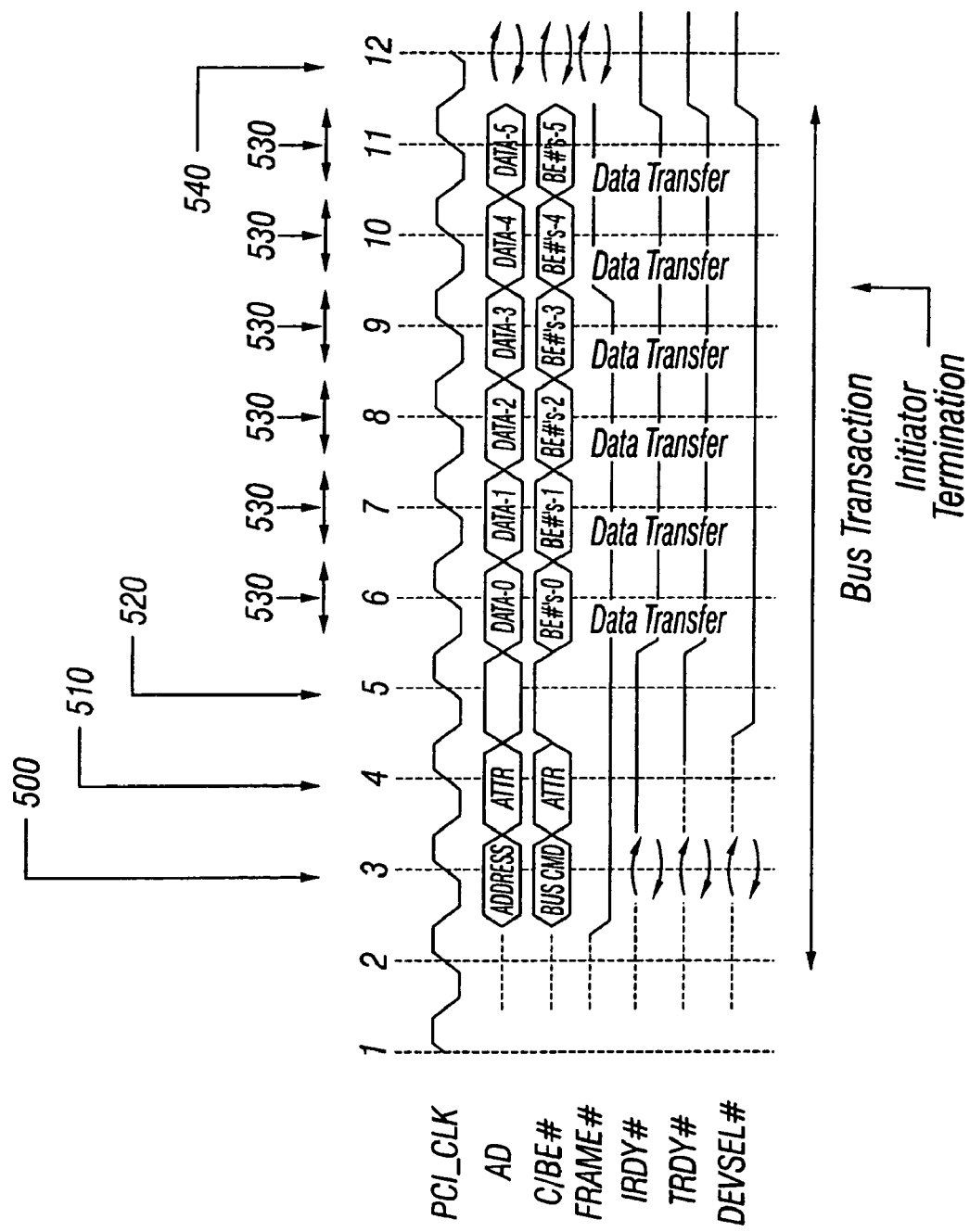
FIG. 5 is a timing diagram of a conventional PCI-X transaction.

FIG. 5 shows a timing diagram of a conventional burst write transaction according to the PCI-X protocol. An address phase of the transaction 500 provides an address data on the AD portion of the bus, while a command is inserted into a C/BE# portion of the bus. An attribute phase 510 follows, with attribute data on both the AD and C/BE# portions of the bus. The completer device accepts the transaction in completer response phase 520, followed by a series of data phases 530, in which a byte enable value is inserted into the C/BE# portion of the bus, corresponding to a payload data inserted into the AD portion of the bus. Finally, in step 540, the bus is turned around for a next transaction. Although FIG. 5 shows a burst write transaction, the PCI-X protocol allows other forms of transactions, which differ in the number of data phases 530 and the contents of the C/BE# portion of the bus during those data phases 530.

Turning to FIG. 6A-6B, a conventional attribute phase for a PCI-X transaction is shown. FIG. 6A illustrates a byte-enable transaction, while FIG. 6B illustrates a DWORD transaction. Note that bits AD[31:8] are common between these forms. The attribute data of FIGS. 6A-6B show a requester function number in bits AD[10:8], a requester device number in bits AD[15:11], and a requester bus number in bits AD[23:16]. A reserved bit is shown in AD[31:31].

Figure 7:
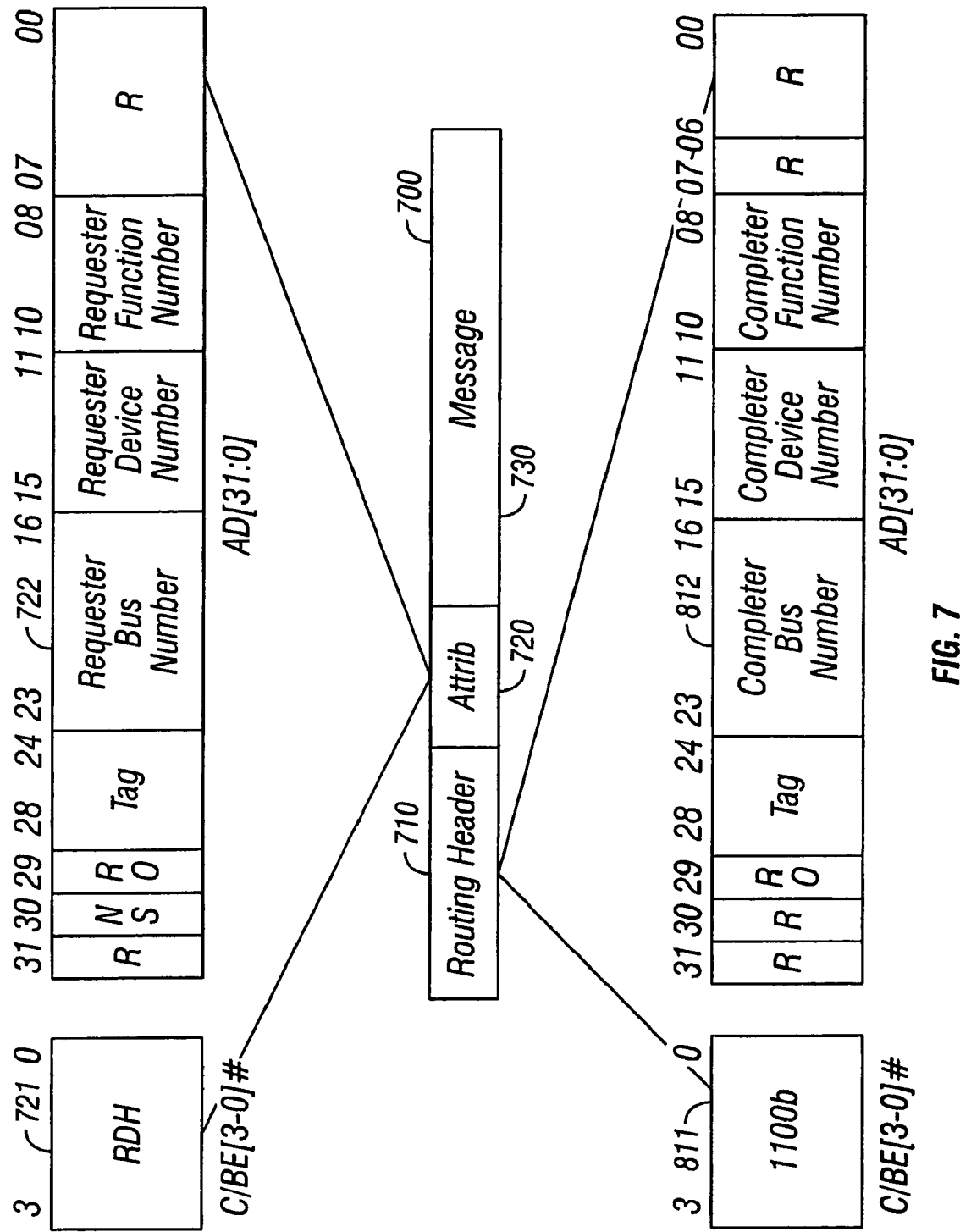
FIG. 7 is a block diagram of a peer-to-peer transaction according to a disclosed embodiment.

This attribute data serves to identify the requester device 340, including its location in an interconnect bus hierarchy, allowing the completer device 350 to identify the requester device 340. However, most conventional PCI-X transactions do not identify the completer device 350's location in the interconnect bus hierarchy using bus number, device number, and function number, as with the requester attribute data, but use a memory-mapped address in the address phase. According to one embodiment, a peer-to-peer transaction is routed to the completer using the completer's bus number, device number, and function number, as provided by the operating system or the requester's device driver, in the address phase of the transaction as illustrated in FIG. 7, discussed below. This completer device address data provides the location of the completer device in the interconnect bus hierarchy directly, equivalent to the conventional requester attribute data of FIGS. 6A-6B.

As shown in FIG. 7, a peer-to-peer transaction according to a disclosed embodiment uses the command defined as Split Completion in the PCI-X Specification, indicated as 1100b on the C/BE# lines during the address phase. In one embodiment, one of the reserved bits of field 722, for example bit AD[31:31], marked with "R" in FIG. 7, identifies the transaction as a peer-to-peer transaction instead of a Split Completion transaction. Other reserved bits can be used to distinguish the Split Completion format from a peer-to-peer command. Further, other arrangements of the field 722 can be used. Other techniques for indicating the transaction as a peer-to-peer transaction can be used.

Field 722 contains requester attribute information, as in conventional PCI transactions. Field 721 is shown as reserved driven high ("RDH"). The reserved bits of field 721 and 722 can be assigned as desired to indicate special kinds of peer-to-peer transactions. For example, isochronous transactions as below can use on of these reserved bits to indicate an isochronous peer-to-peer transaction.

Figure 8:
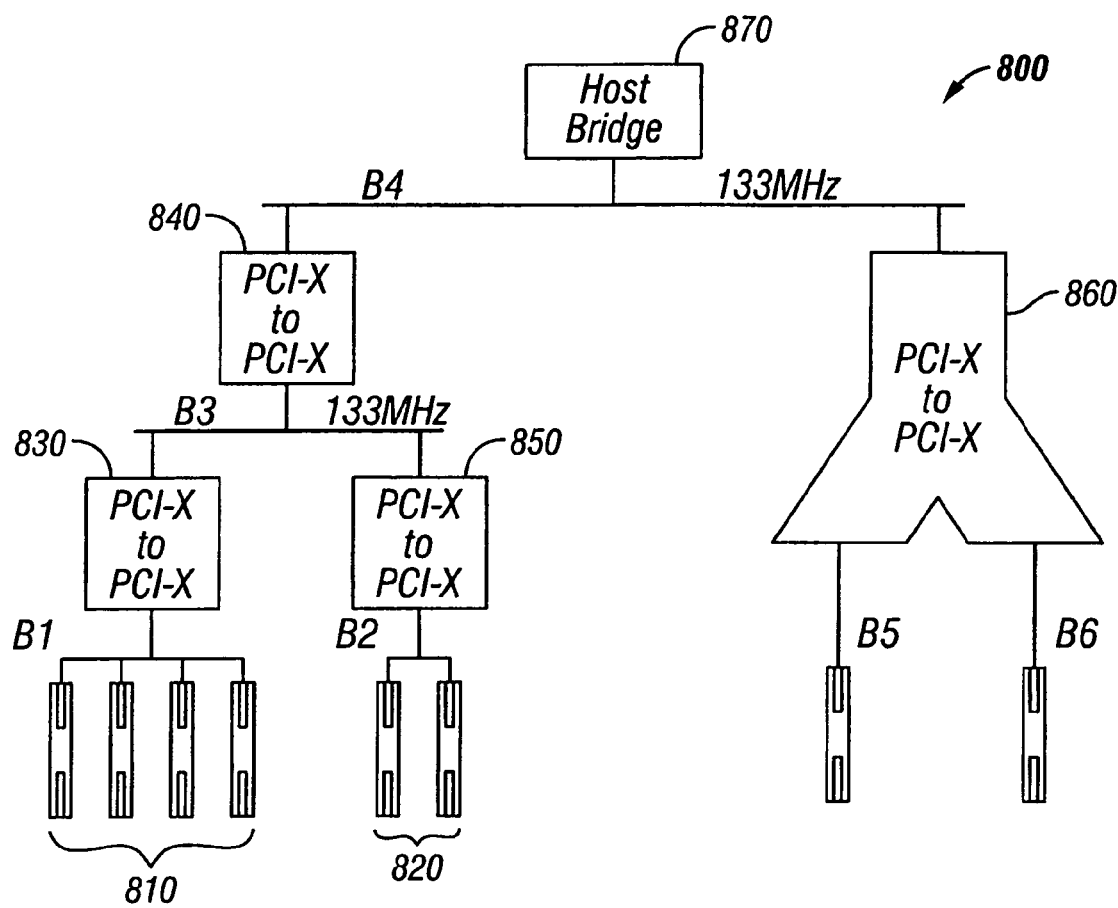
FIG. 8 is a block diagram illustrating a hierarchy of PCI-X bus segments.

One use for the routing header 710 of FIG. 7 is for routing a peer-to-peer transaction across multiple bus segments of an interconnect bus hierarchy. As shown in FIG. 8, a requester 810 is on bus segment B1, while completer 820 is on bus segment B2. Peer-to-peer transactions between requester 810 and completer 820 must traverse the bus hierarchy 800 through bridges 830 and 850 which are connected to bus segment B3. The routing header 710 identifies the completer device and completer bus segment for bridges 830 and 850, allowing the peer-to-peer transaction to be routed across the bus hierarchy 800 appropriately.

A PCI-X bridge uses this field 710 to identify transactions to forward. If the bus number field of this routing header 710 on the secondary bus is not between the bridge's secondary bus number and subordinate bus number, inclusive, the bridge forwards the transaction upstream. If the bus number field of this routing header 710 on the primary bus is between the bridge's secondary bus number and subordinate bus number, inclusive, the bridge forwards the transaction downstream. If the bridge forwards transaction to another bus operating in PCI-X mode, it leaves the routing header 710 unmodified.

Figure 9:
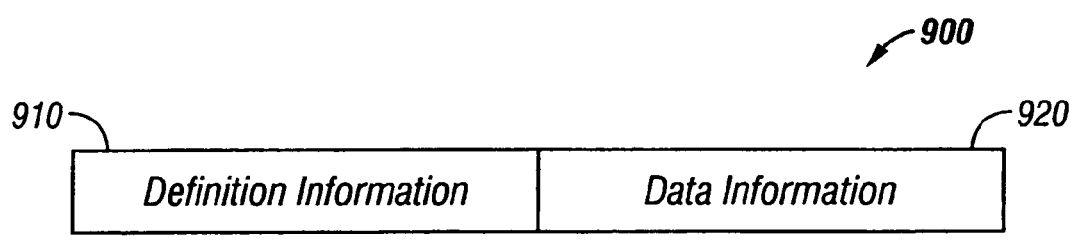
FIG. 9 is a block diagram illustrating a self-identifying payload data according to one embodiment.

Turning to FIG. 9, a block diagram illustrates the use of a self-defining payload data in the data phase(s) of a peer-to-peer transaction according to a disclosed embodiment. Although as discussed herein the self-defining payload data is used in peer-to-peer transactions, transactions between a peripheral and a host can also use a self-defining payload data. The self-defining payload data allows the completer device to strip out certain data that it does not need. For example, a requester device may have breaks in the data that are not needed for the completer device. Therefore, the self-defining payload data allows the completer device to understand the format, structure, and content of the payload data so that it can interpret the payload data, allowing the completer device to strip out pieces that it does not need or perform other desired manipulations of the payload data. Further, a self-defining data format allows devices have their own data format, which can be unique and private between the device and its associated device driver, to specify the data in a peer-to-peer transaction in a standard self-defining payload data format. The use of a self-defining payload data format allows requester and completer devices to convert from the self-defining payload data format to their native data format. Self-defining data is well-known in the art. Examples of techniques for providing self-defining data are the Extensible Markup Language (XML) defined by the World Wide Web Consortium. Another example of a well-known self-defining data format is the Abstract Syntax Notation 1 (ASN. 1) defined by the International Standards Organization (ISO). Other self-defining data formats are known in the art and could be used. Although self-defining data formats are well-known in the art, they have not previously been used in interconnection protocols.

As shown in FIG. 9, a payload data field 900 contains a definition information field 910 and a data information field 920. The definition information field 910 contains information regarding the structure and type of data contained in the data information field 920 sufficient to allow the data information 920 to be interpreted. The specific technique used to encode or define the data information is not significant. Although shown as two separate fields, the definition information and the data information may be intermixed, depending upon the self-defining data technique used.

In one embodiment, the self-defining payload data can contain an address in a requester device address space for the data contained in the self-defining payload data. Conventional PCI-X devices use a shared PCI-X address space, into which the PCI-X devices are mapped. In peer-to-peer transactions according to a disclosed embodiment, the completer device can use an address in the completer device's address space to specify where the data contained in the self-defining payload data is to be stored on the completer device, such as the address of a buffer of the completer device. The completer device in one embodiment can obtain that information from its device driver. In another embodiment, a completer device can associate an address in the completer device's address space with a requester device, such that peer-to-peer transactions from the requester device will place data in the associated completer device address space location. In another embodiment, the completer device and/or the requester device can negotiate the completer device address space address with the operating system. In another embodiment, an attribute in the attribute phase can indicate that the payload data contains an address in the completer address space.

In one embodiment, the presence of a self-defining payload data format in the data phase of a transaction is identified by use of a bit in the requester attribute data field of the transaction, such as the AD[31:31] bit marked with an "R" as reserved in FIG. 7. Setting this bit indicates the payload data of the data phase is in the self-defining data format. Other bits could be used to indicate the presence of a self-defining payload data format, such as one of the C/BE# bits marked as "RDH" for "Reserved Driven High" in the attribute phase of the transaction of FIG. 8.

The present invention also provides a technique for enhancing the operation of computer system busses that use the extensions to the peripheral component interconnect specification (hereinafter PCI-X busses), as well as logic circuits and signal protocols thereof. For illustrative purposes, embodiments are described herein for computer systems using Intel Corporation microprocessor architectures, and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X busses, other bus architectures and protocols could also be used, such as the 3GIO bus architecture and protocol promoted by Intel Corporation. Microsoft Corporation. IBM Corporation. Compaq Computer Corporation and Dell Computer Corporation Referring to FIG. 10, an exemplary schematic block diagram illustrates a computer system according to a disclosed embodiment. The computer system is generally indicated by the numeral 1100 and comprises central processing unit(s) (CPU) 1102, core logic 1104, system random access memory (RAM) 1106, a video graphics controller 1110, a local frame buffer 1108, a video display 1112, a PCI/SCSI bus adapter 1114, a PCI/EISA/ISA bridge 1116, a PCI/IDE controller 1118, and, optionally, a network interface card (NIC) 1122. Single or multilevel cache memory (not illustrated) may also he included in the computer system 1100 according to the current art of microprocessor computer systems. The CPU 1102 may be a plurality of CPUs 1102 in a symmetric or asymmetric multi-processor configuration.

Figure 11:
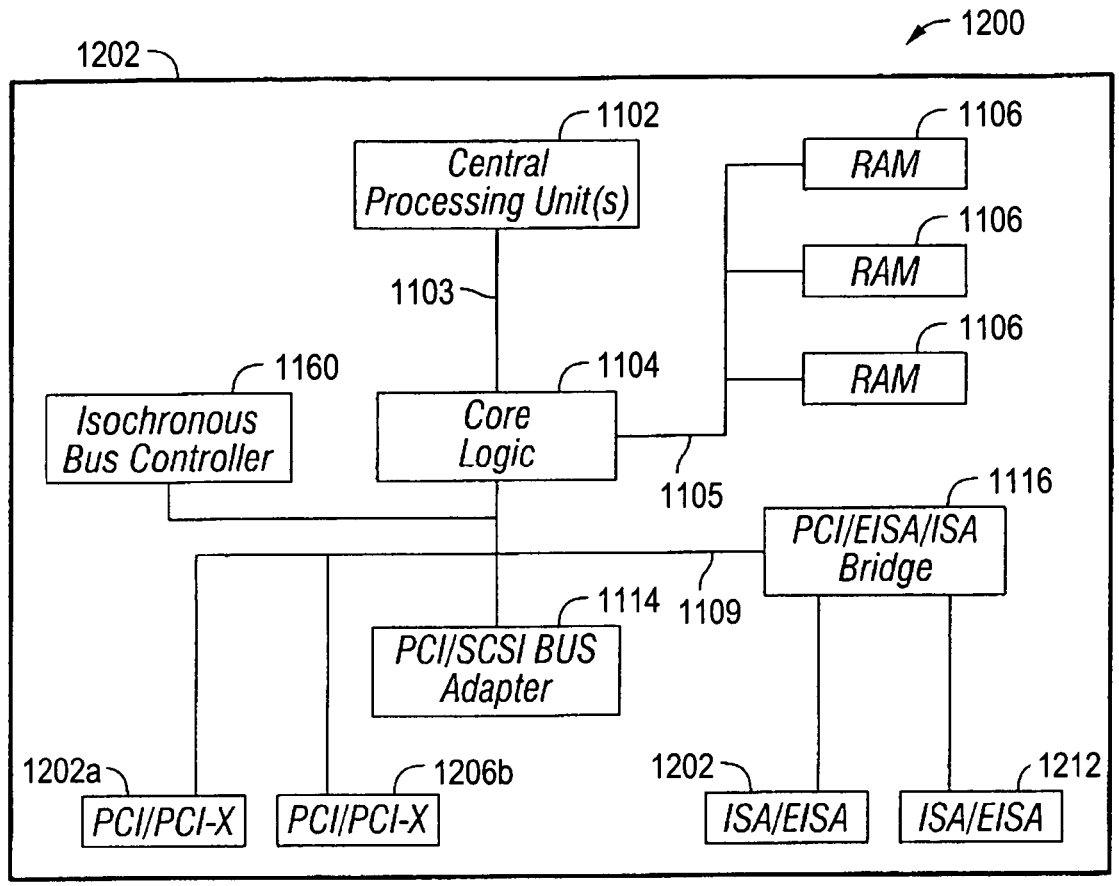
FIG. 11 is a schematic diagram of a printed circuit motherboard of the computer system of FIG. 10.

The CPU 1102 is connected to the core logic 1104 through a CPU host bus 1103. The system RAM 1106 is connected to the core logic 1104 through a memory bus 105. The core logic 1104 includes a host-to-PCI bridge between the host bus 1103, the memory bus 1105, and a PCI-X bus 1109. More than one PCI-X bus is contemplated herein as well as PCI-X-to-PCI-X bridges (not illustrated), and is within the scope and intent of the present invention. The local frame buffer 1108 is connected between the video graphics controller 1110 and the PCI-X bus 109. The PCI/SCSI bus adapter 1114, PCI/EISA/ISA bridge 1116. PCI/IDE controller 1118 and the NIC 1122 are connected to the PCI-X bus 1109. Some of the PCI-X devices such as the video controller 1110 and NIC 1122 may plug into PCI connectors on the computer system 1100 motherboard (FIG. 11).

Hard disk 1130 and tape drive 1132 are connected to the PCI/SCSI bus adapter 1114 through a SCSI bus 1111. The NIC 1122 may be connected to a local area network 1119. The PCI/EISA/ISA bridge 1116 connects over an EISA/ISA bus 1113 to a ROM BIOS 1140, nonvolatile random access memory (NVRAM) 1142. modem 1120, and input-output controller 1126. The modem 1120 connects to a telephone line 1121. The input-output controller 1126 interfaces with a keyboard 1146, real time clock (RTC) 1144, mouse 1148, floppy disk drive (FDD) 1150, serial port 1152, and parallel port 1154. The EISA/ISA bus 1113 is a slower information bus than the PCI-X bus 1109 with lower interface costs. Further, the disk 128 and CD ROM 134 are connected to the PCI/IDE controller 118.

When the computer system 1100 is first turned on, start-up information stored in the ROM BIOS 1140 is used to begin operation thereof. Basic setup (BIOS) instructions are stored in the ROM BIOS 1140 so that the computer system 1100 can load more complex operating system (OS) software from a memory storage device, such as the disk 1130. Before the operating system software can he loaded. however, certain hardware in the computer system 1100 is configured to properly transfer information from the disk 1130 to the CPU 1102, in the computer system 1100 illustrated in FIG. 10, the PCI/SCSI bus adapter 1114 is configured to respond to commands from the CPU 1102 over the PC 1-X bus 1109 and transfer information from the disk 1130 to the CPU 1102 via busses 1109 and 1103. The PCI/SCSI bus adapter 1114 is a PCI-X device and remains platform independent. Therefore, separate hardware independent commands are used to setup and control any PCI-X device in the computer system 1100. These hardware independent commands, however, are located in PCI-X BIOS contained in the computer system ROM BIOS 1140. The PCI-X BIOS is firmware that is hardware specific but meets the general *PCI Local Bus Specification, Revision* 2.2 (the PCI specification) together with the general *PCI-X Addendum to the PCI-X Local Bits Specification* 1.0 (the PCI-X specification), both of which are incorporated by reference herein in their entirety. Plug and play and PCI devices (both PCI and PCI-X) in the computer system are detected and configured when a system configuration program is executed. The results of the plug and play and PCI-X device configurations are stored in the NVRAM 1142 for later use by the startup programs in the ROM BIOS 1140 and the PCI-X BIOS that configure the necessary computer system 1100 devices during startup. Also during startup a "built-in-self-test" (BIST) may do diagnostic testing of components, such as PCI-X devices, in the computer system.

An isochronous bus controller 1160 is connected to the PCI-X bus 1109, for managing isochronous channels on the PCI-X bus 1109. Although shown as a separate circuitry 1160, the isochronous bus controller 1160 can be combined in a single chip or chip set with the core logic 1104. Further, although the PCI-X bus 1109 of FIG. 1 is a single PCI-X bus segment, the PCI-X bus 1109 can be divided into a hierarchy of bridged PCI-X bus segments as described below and the isochronous bus controller can also be divided into distributed isochronous bus controllers, each controlling a portion of the hierarchy of PCI-X bus segments. Some of the distributed isochronous bus controllers can be combined with PCI-X to PCI-X bus bridges of the PCI-X bus hierarchy.

Figure 10:
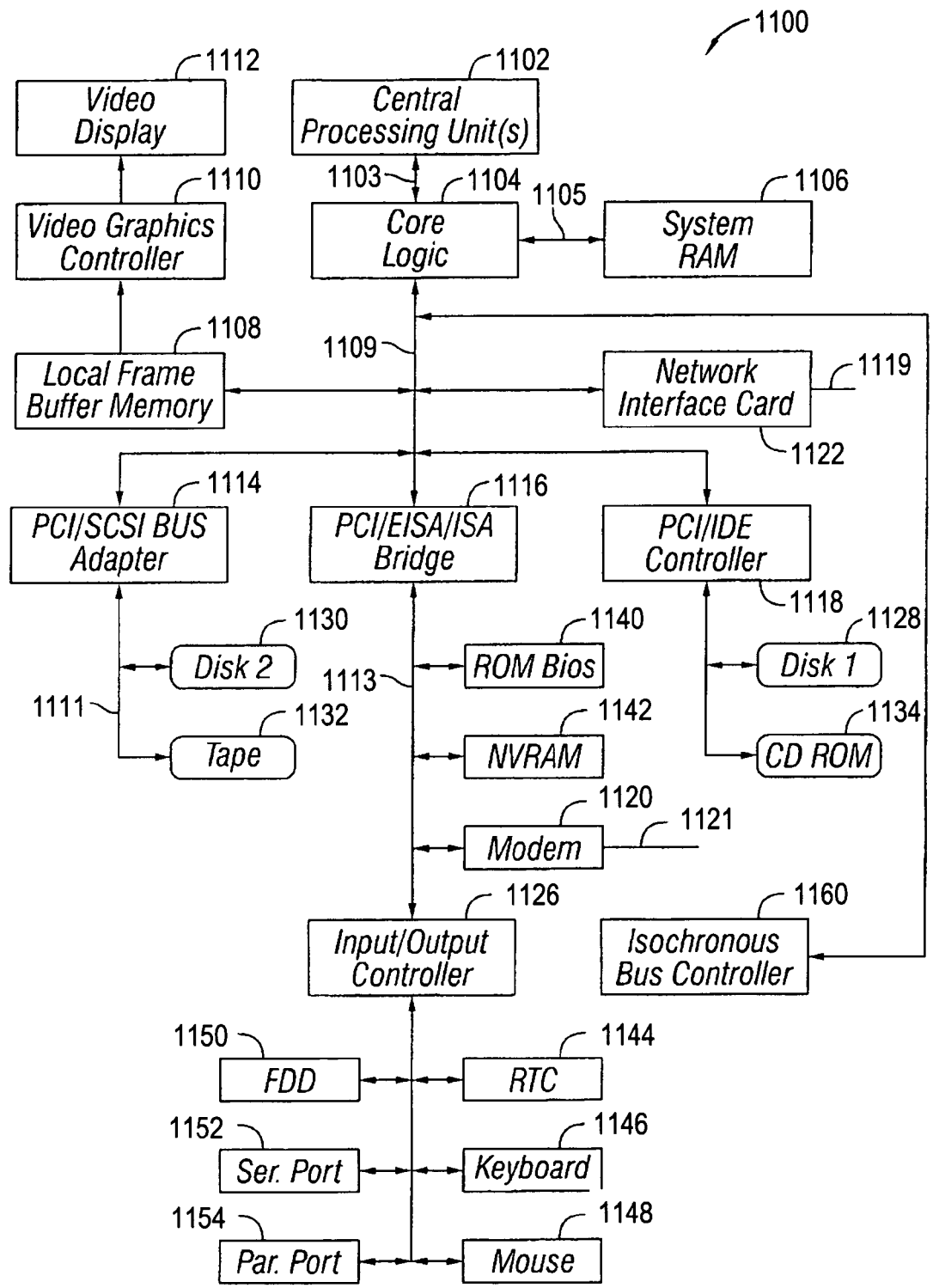
FIG. 10 is a schematic block diagram of a computer system in accordance with a disclosed embodiment.

Referring to FIG. 11, a schematic diagram of an exemplary computer system motherboard according to FIG. 10 is illustrated. The computer system motherboard 1200 comprises printed circuit hoard 1202, on which components and connectors are mounted thereto. The printed circuit board 1202 comprises conductive printed wiring used to interconnect the components and connectors thereon. The conductive printed wiring (illustrated as busses 1103, 1105 and 1109) may be arranged into signal busses having controlled impedance characteristics. Illustrated on the printed circuit board are the core logic 104, CPU(s) 102, RAM 106, embedded PCI/ISA/EISA bridge 1116. ISA/EISA connectors 1212, embedded PCI/SCSI bus adapter 1114, and PCI/PCI-X connectors 1206*a*, 1206*b* (connectors are the same for PCI and PCI-X). The motherboard 1200 may he assembled into a case with a power supply, disk drives, etc., (not illustrated) which comprise the computer system 1100 of FIG. 10. In one embodiment, the isochronous bus controller 1160 can be an adapter plugged into one of the PCI/PCI-X connectors 1206.

Figure 12:
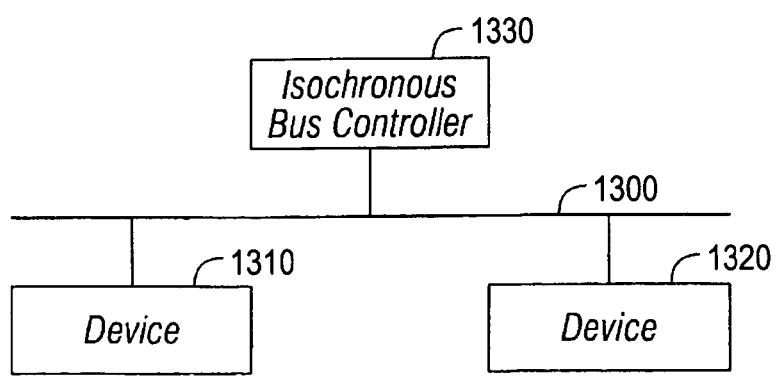
FIG. 12 is a block diagram of an exemplary bus segment in accordance with a disclosed embodiment.

As noted above, isochronous communications are important for streaming video, audio, and other similar data streams that need a particular quality of service. Turning to FIG. 12, an exemplary PCI-X bus segment 1300 is shown. Coupled to PCI-X bus segment 1300 are two PCI-X devices 1310 and 1320. Devices 1310 and 1320 can be any PCI-X devices capable of isochronous communications. For example, device 1310 can be a video display adapter, while device 1320 can be a video playback device. Other devices can be attached to the bus segment 1300, but are omitted for clarity. A PCI-X isochronous bus controller 1330 is also coupled to the PCI-X bus segment 1300. The isochronous bus controller 1330 can be the core logic 1104, as shown in FIG. 10, or a separate isochronous bus controller logic as described above. An isochronous channel is established between two endpoint devices 1310 and 1320 by the isochronous bus controller 1330, with a maximum bandwidth for the isochronous channel guaranteed by the isochronous bus controller 1330. Although time division multiplexing also guarantees a certain bandwidth, this technique for establishing and using isochronous channels differs in that fixed time slots are not allocated to the endpoint, and the bandwidth used by the channel can vary up to the guaranteed maximum. Thus, isochronous channels can provide more efficient use of available bandwidth when the data flow between the endpoints can be at a variable rate, because unused bandwidth can be made available for other devices on the bus.

In addition, devices needing isochronous communications can require a minimum and maximum service window to enable the devices to process the data. For example, a device may be able to process data in an isochronous channel at up to 10 MB/second, but only if the data is transmitted in service windows of 1MB to 2MB, and not if the data is transmitted in service windows of 1 byte or 10MB because of internal processing overhead or other constraints such as buffer sizes.

Because isochronous channels are defined by bandwidth and a service window. Establishing an isochronous channel in a disclosed embodiment specifies a required bandwidth and a required service window. The isochronous channel can then be established allocating the required bandwidth with a service window between the minimum service window and the maximum service window values. If insufficient bandwidth is available to allocate the isochronous channel or if no service window of the required size is available at that bandwidth, the request to establish an isochronous channel fails.

Once an isochronous channel is established, the endpoints of the channel can communicate during each service window for the duration of the channel in the expectation of being able to transmit data at a guaranteed rate, regardless of other traffic on the bus. Once the requester no longer needs the isochronous channel, the channel is "torn down" and channel and completer resources are freed.

Figure 13:
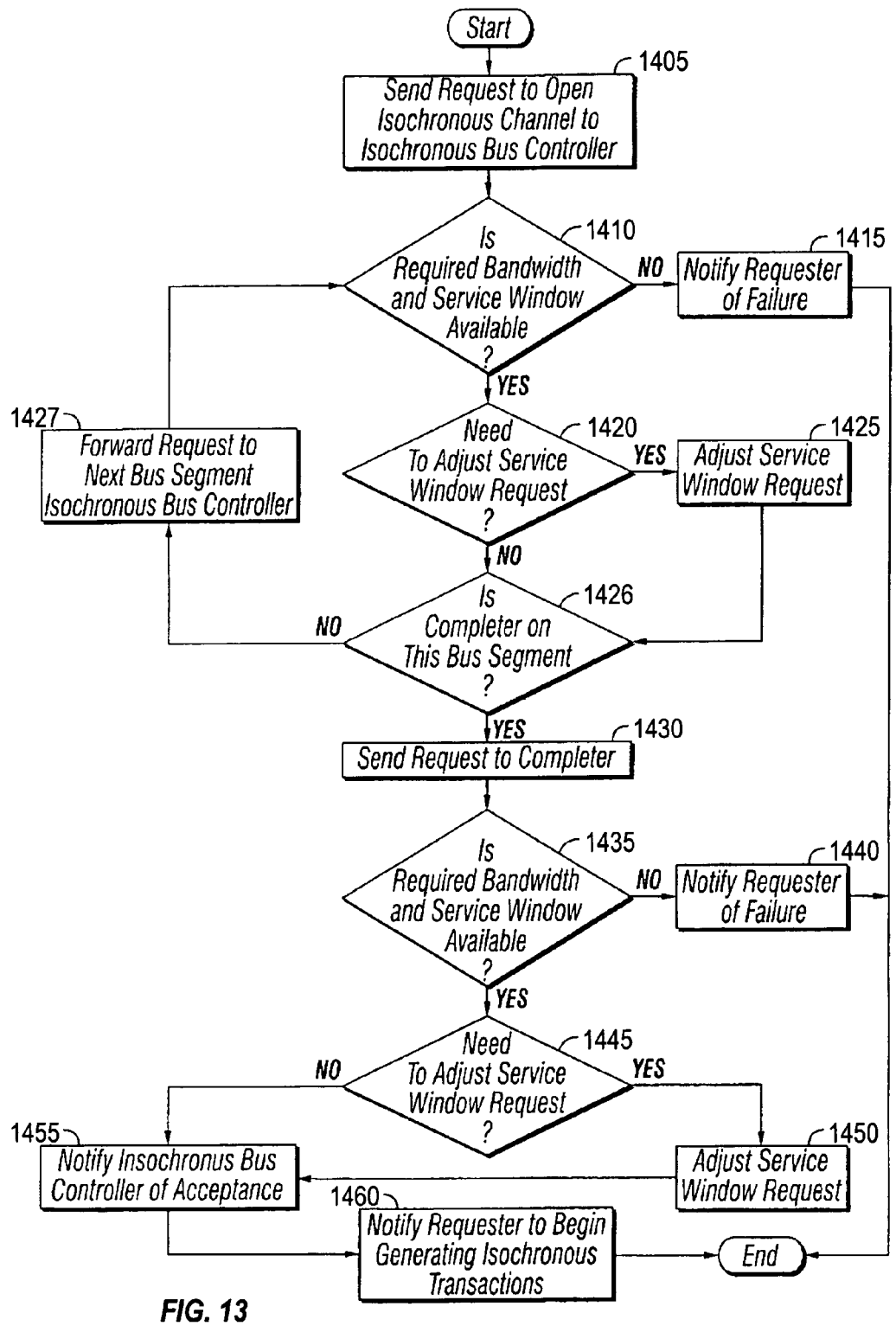
FIG. 13 is a flowchart illustrating establishing an isochronous channel according to a disclosed embodiment.

Turning to FIG. 13, a flowchart illustrates establishing an isochronous channel according to a disclosed embodiment. In step 1405, a requester device, corresponding to device 1310 in FIG. 12, requests establishment of the isochronous channel with a completer device 1320 from the isochronous bus controller 1330. In one embodiment, the request specifies a required bandwidth and a required service window sizes which can be specified as a minimum and maximum service window size.

Figure 17:
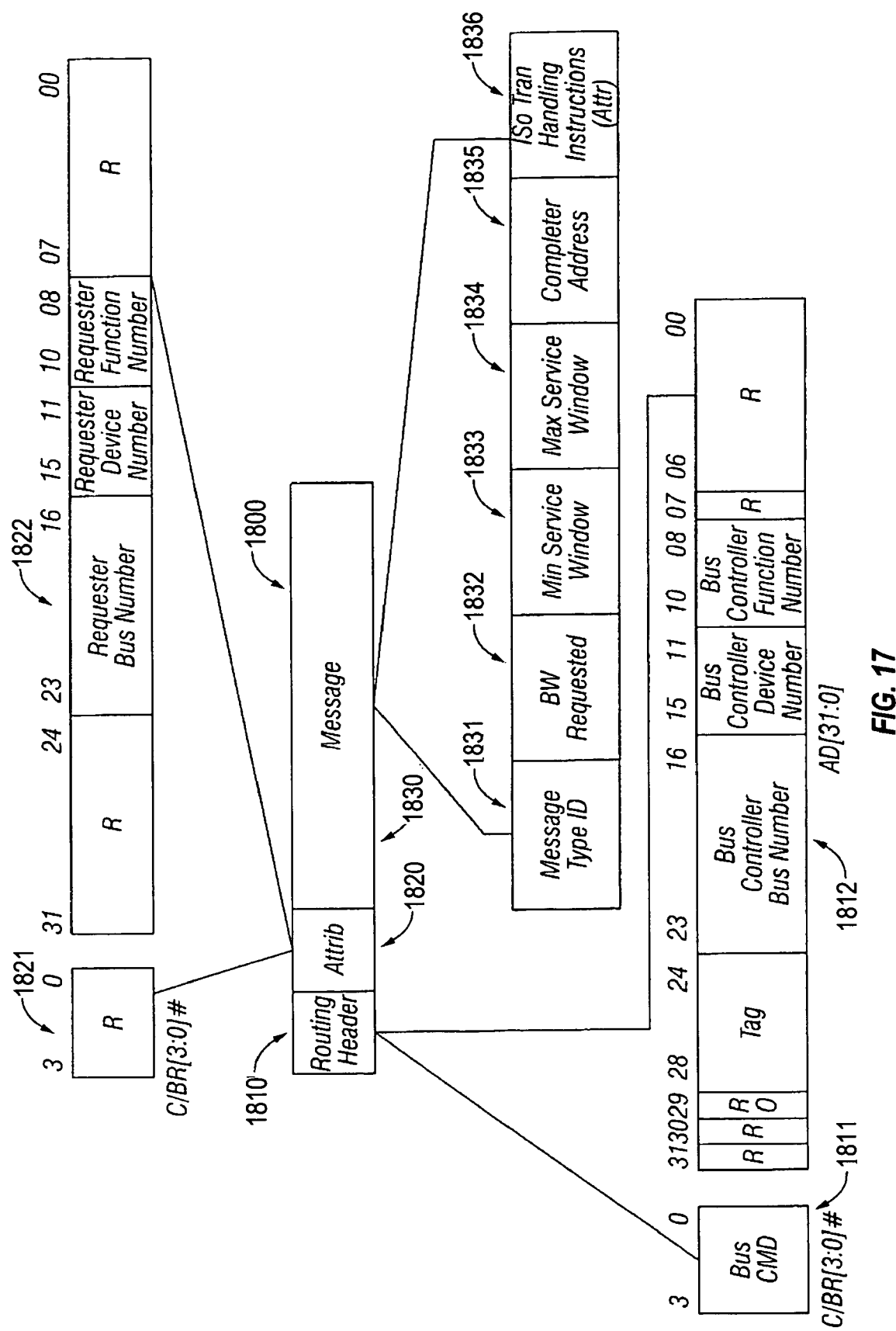
FIG. 17 is a block diagram of a PCI-X transaction according to one embodiment.

In one embodiment, the transaction can be a PCI-X transaction constructed as shown in FIG. 17. A routing header 1810 is specified in the PCI-X address phase, using a format similar to the PCI-X Split Completion transaction. A bus command 1811 is specified on the C/BE[3:0]# lines. In one embodiment, the bus command operates like the PCI-X Split Completion bus command. A isochronous bus controller address 1812 is specified on the AD lines.

As shown in FIG. 17, the isochronous bus controller bus number, device number, and function number are specified in AD[23:16], AD[15-11], and AD[10-8], respectively. This address information allows the transaction to be routed by any necessary PCI-X bridges intermediate between the requester 1310 and the isochronous bus controller 1330. In one embodiment, multiple bridges and distributed isochronous bus controllers each controlling one or more interconnect bus segments, must be traversed on a path between the requestor 1310 and the completer 1320 as described below. In that embodiment, the routing header bus number is changed as the transaction traverses the path. When the transaction reaches the completer 1320, the device number and function number are changed to identity the completer 1320 device number and function number.

In an attribute phase of the transaction 1800, the requestor 1310 specifies the requester attributes of the first device 1310 in the conventional PCI-X fashion, as shown in fields 1821 on the C/BE[3:0]# lines and the AD[31:0] lines of field 1822, including the requester addresses expressed as bus number (AD[23:16]), device number (AD[15:11]), and function number (AD[10:8]). In one embodiment, the attribute phase can identify the transaction 1800 as a message type transaction. In the data phase of the transaction 1800, a message field 1830 contains the request constraints. A message type field 1831 indicates this transaction 1800 is an isochronous channel request. Field 1832 specifies the required bandwidth. In one embodiment, the field 1832 is specified in terms of MB/second. Other units can be used. Fields 1833 and 1834 specify a minimum service window and a maximum service window. A service window is a period during which isochronous transactions can be generated for the isochronous channel. For example, an isochronous channel with a bandwidth of 20MB/s can have a service window of 1/10 of a second. The isochronous bus controller 1330 and any bridges between the requester 1310 and completer 1320 can increase the minimum service window 1833 and reduce the maximum service window as necessary, based on available service windows along the path. A completer address field 1835 specifies the completer 1320's bus number, device number, and function number similar to the attribute field 1820's requester address. Additional isochronous transaction attributes, such as a "no snooping" attribute are specified in field 1836. Other arrangements and fields could be used as desired.

The isochronous bus controller 1330 then accepts the transaction by asserting the PCI-X DEVSEL# signal according to the PCI-X protocol. In one embodiment, a device driver of an operating system associated with the isochronous bus controller 1330 processes the request. In another embodiment, firmware or hardware of the isochronous bus controller 1330 processes the request.

In step 1410, the isochronous bus controller 1330 determines whether sufficient bandwidth is available for the requested isochronous channel, comparing the available bandwidth of the PCI-X bus to the required bandwidth and the determining if the required service window is available. If the available bandwidth is less than the required bandwidth, the isochronous bus controller 1330 will complete the isochronous channel request in step 1415, indicating failure of the request. If no service window of the required sized is available, the isochronous bus controller will fail the request.

In step 1420, the isochronous bus controller determines whether the required service window sizes must be adjusted. If the available service window sizes are greater than the minimum service window size or less than the maximum service window size, the service window requirement can be adjusted by the isochronous bus controller 1330 in step 1425. If the completer 1320 is on a different bus segment than the requester 1310, then the request will be forwarded to all isochronous bus controllers 1330 that service a path between the requester 1310 and the completer 1320, as shown in steps 1426-1427, repeating steps 1410-1427 for each isochronous bus controller servicing the path.

The transaction is then forwarded to the completer 1320 in step 1430. In one embodiment, the isochronous bus controller(s) 1330 that service the path between the requester 1310 and the completer 1320 can tentatively reserve bandwidth for the isochronous channel, pending acceptance by the completer 1320.

The completer 1320 accepts the transaction by asserting DEVSEL# according to the PCI-X Specification, then compares the required bandwidth and service window values to the bandwidth and service window capability of the completer 1320 in steps 1435-1450 similarly to the processing by each isochronous bus controller 1330 in steps 1410-1425.

If the bandwidth and service window requirements of the request can be met by the completer 1320, each isochronous bus controller 1330 is notified of the acceptance of the request in step 1455. The isochronous bus controller 1330 then establishes the requested isochronous channel, allocating the requested bandwidth and service window. If the requester 1310 and the completer 1320 are on different bus segments, the acceptance will be forwarded back through the isochronous bus controller(s) 1330 that service the path between completer 1320 and requester 1310.

In step 1460, the isochronous bus controller 1330 then notifies the requester 1310 device that the isochronous channel has been established and notifies the requester 1310 to begin sending isochronous transaction requests to the completer 1320. In one embodiment, the isochronous bus controller 1330 notifies the requester 1310 by using a PCI-X special cycle command. At this point the isochronous channel has been established.

The isochronous bus controller 1330 manages the isochronous channel. In one embodiment, the isochronous bus controller 1330 can use a timer to determine the length of the service window during which the requester 1310 can submit isochronous transactions.

Figure 14:
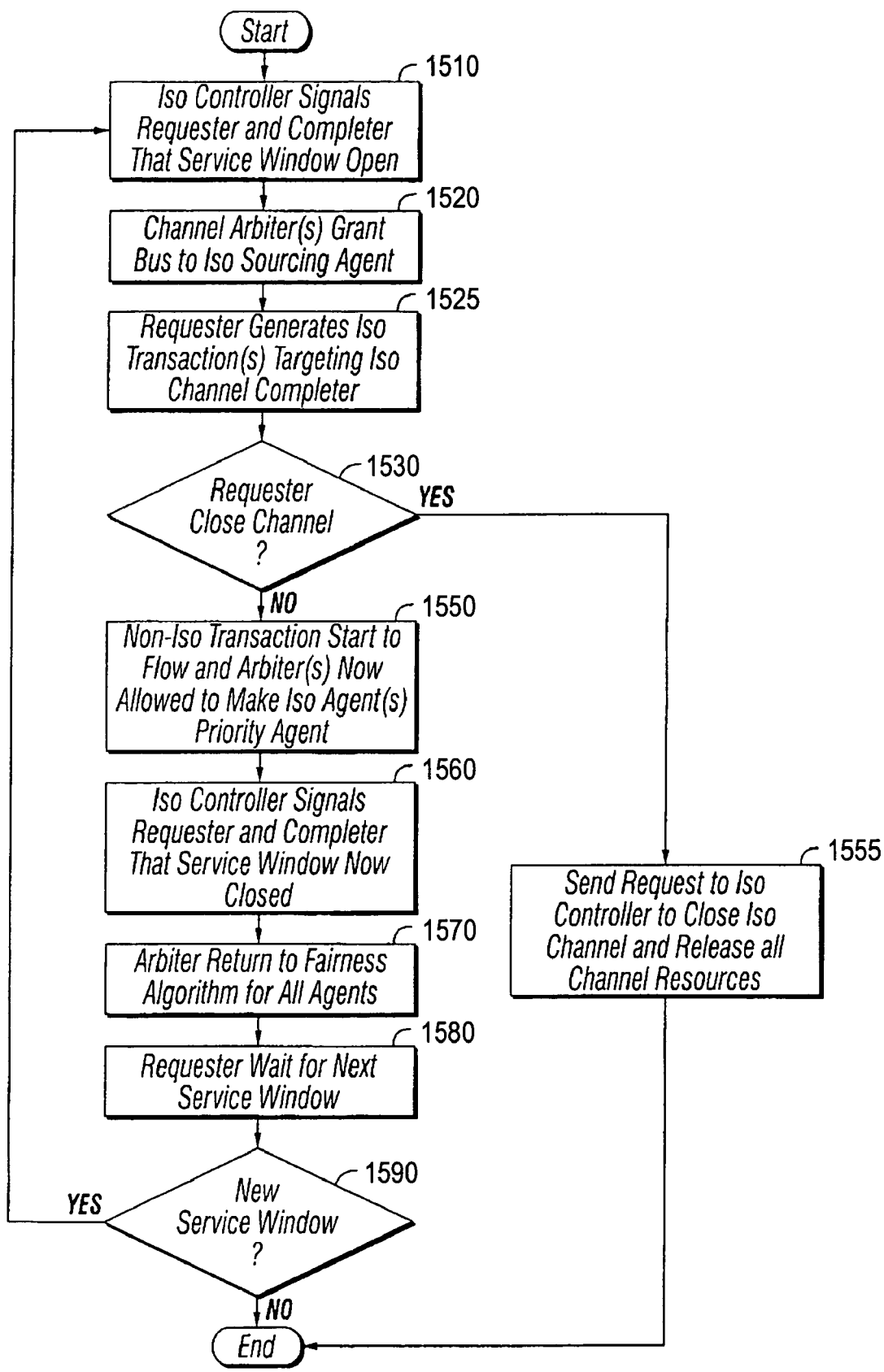
FIG. 14 is a flowchart illustrating sending isochronous transactions using an isochronous channel according to a disclosed embodiment.

Turning to FIG. 14, the isochronous bus controller 1330 notifies the requester 1310 and the completer 1320 in step 1510 that a service window has opened, using a special cycle transaction as in step 1460 of FIG. 13. A bus arbiter, such as a PCI-to-PCI bridge, which can be separate from the isochronous bus controller or combined with the isochronous bus controller, controls access to each bus segment on the path between the requester 1310 and the completer 1320. As the bus arbiter receives the first isochronous transaction from its sourcing agent, the bus arbiter grants the bus segment to the sourcing agent in step 1520, typically using a conventional PCI fairness algorithm. The bus arbiter further recognizes that an isochronous window is being opened and parks the bus segment on its sourcing agent.

The requester 1310 then generates isochronous transactions to the completer device 1320 in step 1525, marking each transaction as isochronous, as described below.

In one embodiment, if the requester 1310 is finished with the isochronous channel before the end of the service window as determined in step 1530, the requester 1310 can notify the isochronous bus controller to close the isochronous channel in step 1555. The isochronous controller 1330 can then close the isochronous channel, which indicates to the bus arbiters to release resources dedicated to the isochronous channel, and return to the conventional PCI fairness algorithm for granting access to the bus segment controlled by the bus arbiter.

Non isochronous transactions can then begin to flow on the traversed bus segments in step 1550. In one embodiment, the bus arbiters along the isochronous channel path make their isochronous channel sourcing agents priority agents rising conventional PCI techniques, to allow quick response to the next isochronous transaction in a service window.

At the end of the isochronous service window period, the isochronous bus controller 1330 notifies the requester 1310 and the completer 1320 in step 1560 that the service window is closed. In one embodiment, the isochronous bus controller 1330 uses another PCI-X special cycle transaction to notify the requester 1310 and the completer 1320 of the end of the service window. Other notification techniques can be used.

In step 1570, the bus arbiters along the path between requester 1310 and completer 1320 can now resume using conventional PCI arbitration techniques for their bus segments, such as conventional fairness algorithms.

The requester 1310 then waits for a next service window to open in step 1580. While waiting for the next service window, the requester 1310 can perform other actions as required. In one embodiment, the isochronous bus controller 1330 can use a timer to determine when to initiate opening the next service window.

Once the service window has been closed in step 1560, if a new service window is to be opened, as determined in step 1590, steps 1510 through 1580 can be repeated multiple times, with the isochronous bus controller opening and closing service windows for the isochronous channel.

The isochronous bus controller 1330 monitors the transactions on the bus requested by the requester 1310. At any time that the isochronous bus controller 1330 determines that the requester 1310 is misbehaving, the isochronous bus controller 1330 can notify the requester 1310 and the completer 1320 that the service window and/or the isochronous channel are closed. Bus arbiters along the path can then release resources dedicated to the isochronous channel.

The above description ignores errors and error handling that may cause premature closure of service windows and the isochronous channel. One skilled in the art will understand such error handling techniques.

The disclosed technique allows the isochronous bus controller 1330 to enforce the bandwidth allocation of the isochronous channel by instructing the requester 1310 when to begin and when to end sending isochronous transaction requests to the completer 1320. In conventional isochronous techniques, the bandwidth allocation is typically not enforceable, and depends on the "good behavior" of the endpoint devices.

Each isochronous transaction requested by the requester 1310 during the service window period is identified as an isochronous transaction. In one embodiment, the attribute phase of the PCI-X protocol is used to identify the transaction as an isochronous transaction. In another embodiment, isochronous transactions can use the format of peer-to-peer transactions as described above. In a further embodiment, isochronous transactions can include an additional attribute in an attribute phase of the transaction indicating that all data errors should be ignored. This attribute can be used for video streams, for example, in which a momentary error in the picture can simply be ignored or not detectable by the viewer.

If the requester 1310 sends non-isochronous transactions during the isochronous window, the isochronous bus controller 1330 can notify the requester 1310 that the service window and isochronous channel are closed. In addition, if the requester 1310 initiates isochronous transactions with other than the previously indicated requester 1310, the isochronous bus controller 1330 can close the service window and isochronous channels. In one embodiment, the isochronous bus controller 1330 would not close the isochronous channel unless the requester 1310 repeatedly abused the service window. In one embodiment, the isochronous bus controller 1330 uses a PCI-X special cycle to close the service window and isochronous channels, notifying the requester 1310 of the closure of the termination of the service window and isochronous channel.

In addition to identifying the transactions as isochronous, the requester 1310 can set the conventional PCI-X relaxed ordering attribute during the attribute phase of isochronous transactions to allow the isochronous transactions to bypass other transactions that would otherwise block them according to the conventional PCI-X ordering rule. In one embodiment, PCI-X bridges and devices use a reserved isochronous butter queue to ensure the quality of service for isochronous transactions.

Figure 15:
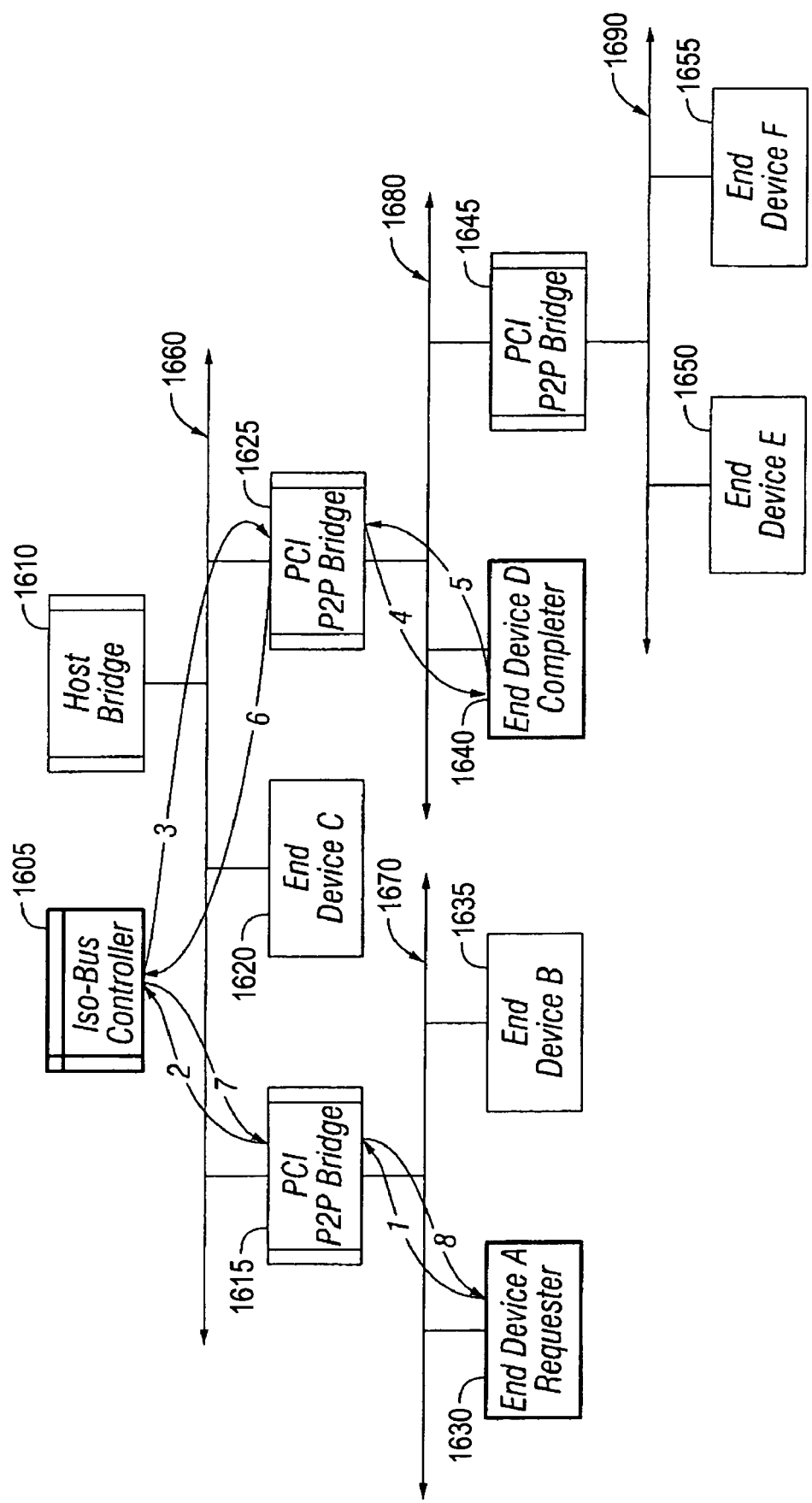
FIG. 15 is a block diagram illustrating an embodiment with a central isochronous bus controller according to one embodiment.
Figure 16:
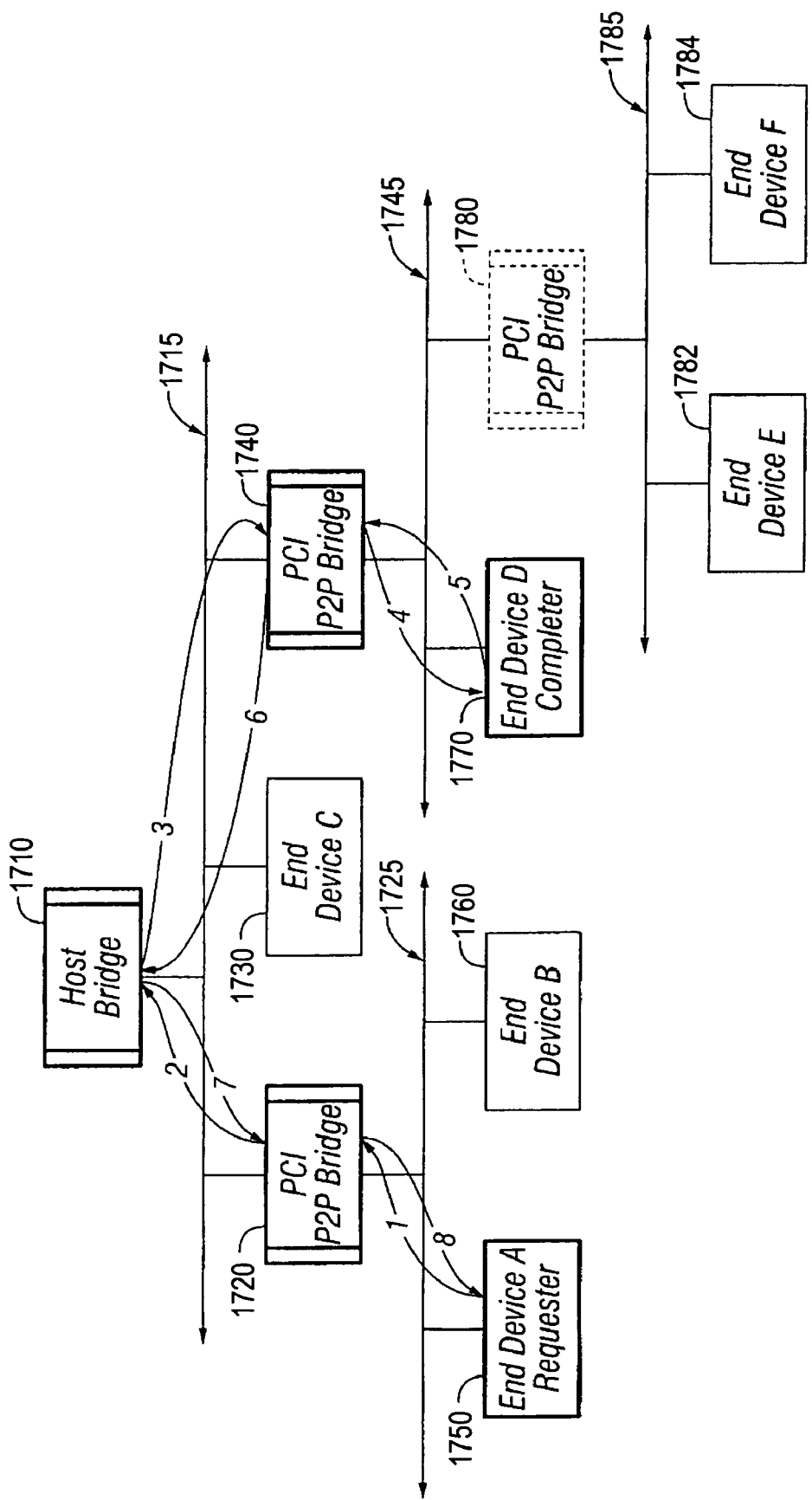
FIG. 16 is a block diagram illustrating an embodiment with a distributed isochronous bus controller according to one embodiment.

As shown in FIG. 12, the isochronous bus controller 1330, the requester 1310, and the completer 1320 are all on the same interconnect bus segment. As shown in FIGS. 15-16, and as described above with regard to FIGS. 13-14, other embodiments are contemplated.

FIG. 15 illustrates an embodiment in which a central isochronous bus controller 1605 controls an interconnect hierarchy of three bus segments 1660, 1670, and 1680.

A requester 1630 makes an isochronous channel request to the isochronous bus controller 1605, which is routed by the PCI-to-PCI bridge 1615 based on the routing header corresponding to field 1810 of FIG. 17, as shown by lines 1 and 2. The isochronous bus controller 1605 then processes the request as explained above, then passes the request to the completer 1640. The path to the completer 1640 traverses bus 1660, bridge 1625, and bus 1680 as shown by lines 3 and 4. However, bridge 1645, not on the path between requester 1630 and completer 1640, does not process the transaction. Further, the end device C 1620 on the bus 1660, the end device B 1635 on the bus 1670, and the end device E 1650 on the bus 1690, and the end device F 1655 on the bus 1690 do not process the transaction. On accepting or failing the request, the path is traversed in reverse, as shown in lines 5-8.

Turning now to FIG. 16, a distributed isochronous bus controller embodiment is shown. In this embodiment, the host bridge 1710, and the PCI-to-PCI bridges 1720, 1740, and 1780 are isochronous bus controllers for bus segments 1715, 1725, 1745, and 1785 respectively. As in FIG. 15, a request from requester 1750 traverses a path from requester 1750 to completer 1770 as shown by lines 1-4. Likewise the acceptance or rejection by the completer 1770 traverses lines 5-8 back to the requester 1750. As in FIG. 15, isochronous bus controller 1780, end device E 1782, end device F 1784, end device C 1730, and end device B 1760 are uninvolved, because the devices are not on the path.

Unlike FIG. 15, however, the isochronous bus controller function is divided among bridges 1710, 1720, and 1740. Thus each bridge 1720, 1710 and 1740 processes and forwards the request for an isochronous channel, individually determining whether the required bandwidth is available on their respective bus segments 1725, 1715, and 1745, as well as potentially adjusting the service window size.

In FIG. 16, the service window size can vary on the different bus segments, being adjusted at each step on the path between requester 1750 and completer 1770. However, the entire path guarantees a quality of service level corresponding to the required bandwidth and with service windows within the minimum and maximum service windows of the original request for an isochronous channel.

In FIG. 15, isochronous bus controller 1605 monitors the isochronous channels from end to end, and opens and closes the service windows as explained above. In FIG. 16, each with the distributed isochronous controllers 1720, 1710, and 1740 monitor separate portions of the channels, and open and close service windows on the bus segments 1725, 1715, and 1745, respectively, controlled by the distributed isochronous bus controllers no. 1710, and 1740. In both embodiments, bridges along the isochronous channel path have separate buffers for isochronous traffic, to ensure isochronous transactions can proceed without being blocked by non-isochronous traffic. In addition, the isochronous bus controller whether centralized as in FIG. 15 or distributed as in FIG. 16, ensures that service windows of different isochronous channels never overlap.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

I claim:

1. A method comprising:
   transmitting a request to establish an isochronous channel between a first device and a second device;
   establishing the isochronous channel between the first device and the second device; and
   generating an isochronous transaction across the isochronous channel between the first device and the second device, wherein the isochronous transaction is a message type transaction according to a PCI family specification, and wherein the message type transaction comprises at least one destination attribute identifying a completer device.

2. The method, as set forth in claim 1, wherein transmitting the request comprises transmitting over a PCI-X interconnect.

3. The method, as set forth in claim 1, wherein the transmitting the request comprises transmitting a command signal on a C/BE# portion of an interconnect bus.

4. The method, as set forth in claim 1, comprising reserving a minimum bandwidth on an interconnect bus for the isochronous transaction.

5. The method, as set forth in claim 1, comprising reserving a service window for the isochronous transaction.

6. The method, as set forth in claim 1, wherein the first device comprises a requester device and the second device comprises the completer device.

7. The method, as set forth in claim 1, comprising notifying a bus arbiter that the isochronous channel has been established.

8. A method comprising:
   receiving a request to establish an isochronous channel between a first device and a second device wherein the isochronous channel is defined by bandwidth and a service window;
   determining whether sufficient bandwidth is available on a hierarchical interconnect bus to support the requested isochronous channel;
   if sufficient bandwidth is available, allocating a portion of the interconnect for the isochronous channel and notifying the first and second devices to establish the isochronous channel; and
   generating an isochronous transaction across the isochronous channel between the first device and the second device, wherein the isochronous transaction is a message type transaction according to a PCI family specification, and wherein the message type transaction comprises at least one destination attribute identifying a completer device.

9. The method, as set forth in claim 8, wherein the hierarchical interconnect bus comprises a PCI-X bus.

10. The method, as set forth in claim 8, wherein notifying the first and second devices comprises generating a command signal on the C/BE# portion of the hierarchical interconnect bus.

11. The method, as set forth in claim 8, wherein receiving a request comprises receiving a minimum service window size and a maximum service window size.

12. The method, as set forth in claim 8, wherein the first device comprises a requester device and the second device comprises the completer device.

13. The method, as set forth in claim 8, comprising tearing down the isochronous channel.

14. A system comprising:
   a first device configured to:
   transmit a request to establish an isochronous channel between the first device and a second device;
   establish the isochronous channel between the first device and the second device; and
   generate an isochronous transaction between the first device and the second device, wherein the isochronous transaction is a message type transaction according to a PCI family specification, and wherein the message type transaction comprises at least one destination attribute identifying a completer device.

15. The system, as set forth in claim 14, comprising:
   an isochronous bus controller coupled to the first device and configured to:
   receive the request to establish an isochronous channel;
   determine whether sufficient bandwidth is available on an interconnect bus to support the requested isochronous channel; and
   if sufficient bandwidth is available, allocate a portion of the interconnect for the isochronous channel.

16. The system, as set forth in claim 15, wherein the isochronous bus controller is configured to notify the first and second devices if sufficient bandwidth is available.

17. The system, as set forth in claim 16, wherein the first device is configured to generate the isochronous transaction after receiving a notification from the isochronous bus controller.

18. The system, as set forth in claim 15, wherein the isochronous bus controller comprises a PCI-X bus arbiter.

19. The system, as set forth in claim 15, wherein the interconnect comprises a PCI-X bus.

20. The system, as set forth in claim 15, wherein the first device is configured to transmit the request on a C/BE# portion of the interconnect bus.

21. A method comprising:

transmitting a request to establish an isochronous channel between a first device and a second device, wherein the request includes bandwidth and service window information and the isochronous channel is defined by bandwidth and a service window;

establishing the isochronous channel between the first device and the second device with a bandwidth and service window corresponding to the bandwidth and service window information in the request; and generating an isochronous transaction across the isochronous channel between the first device and the second device, wherein the isochronous transaction is a message type transaction according to a PCI family specification, and wherein the message type transaction comprises at least one destination attribute identifying a completer device.

22. The method, as set forth in claim 1, wherein the PCI family specification comprises a PCI specification or a PCI-X specification.

23. The system, as set forth in claim 14, wherein the PCI family specification comprises a PCI specification or a PCI-X specification.

24. The method of claim 21, wherein the PCI family specification comprises a PCI specification or a PCI-X specification.

* * * * *